(12) United States Patent
Weber

(10) Patent No.: US 6,302,473 B1
(45) Date of Patent: Oct. 16, 2001

(54) INTEGRAL DOOR INNER REINFORCEMENT

(76) Inventor: Norbert Weber, Rennbahn 9-11, D-52062 Aachen (DE)

( * ) Notice: Subject to any disclaimer, the term of this patent is extended or adjusted under 35 U.S.C. 154(b) by 0 days.

(21) Appl. No.: 09/530,922

(22) PCT Filed: Nov. 6, 1998

(86) PCT No.: PCT/DE98/03252

§ 371 Date: May 3, 2000

§ 102(e) Date: May 3, 2000

(87) PCT Pub. No.: WO99/24278

PCT Pub. Date: May 20, 1999

(30) Foreign Application Priority Data

Nov. 6, 1997 (DE) .............................. 197 48 970

(51) Int. Cl.[7] .................. B62D 25/04; B60J 5/04
(52) U.S. Cl. ............. 296/146.6; 296/188; 296/189; 49/502; 52/735.1
(58) Field of Search ....................... 296/188, 189, 296/146.5, 146.6, 146.7, 146.11; 49/502; 52/735.1

(56) References Cited

U.S. PATENT DOCUMENTS

| 3,882,970 | * | 5/1975 | Newman, Jr. .................. 188/1 |
| 4,306,381 | * | 12/1981 | Presto ......................... 49/502 |
| 4,411,466 | * | 10/1983 | Koike ......................... 296/188 |
| 4,845,894 | * | 7/1989 | Herringshaw ................... 49/502 |
| 4,850,636 | * | 7/1989 | McLaren et al. ............... 296/146 |
| 4,948,196 | | 8/1990 | Baba et al. . |
| 5,314,228 | * | 5/1994 | Figge, Sr. .................... 296/146.6 |
| 5,364,157 | | 11/1994 | Siedecki . |
| 5,505,024 | * | 4/1996 | DeRees et al. ................. 49/503 |
| 5,536,060 | * | 7/1996 | Rashid et al. ................. 296/146.6 |
| 5,743,588 | * | 4/1998 | Ufrecht ....................... 296/146.6 |
| 5,887,938 | * | 3/1999 | Topker et al. ................. 296/188 |
| 5,908,216 | * | 6/1999 | Townsend ..................... 296/146.6 |
| 5,992,922 | * | 11/1999 | Harbig et al. ................. 296/188 |

FOREIGN PATENT DOCUMENTS

| 9407709 | 4/1994 | (WO) . |
| 9843842 | 10/1998 | (WO) . |

* cited by examiner

*Primary Examiner*—Joseph D. Pape
*Assistant Examiner*—Greg Blankenship
(74) *Attorney, Agent, or Firm*—Pandiscio & Pandiscio

(57) ABSTRACT

An integral door inner reinforcement in the form of an elongated profiled part with a pot-shaped portion. The reinforcement is joined at the front, pot-shaped end and at the opposite end to the inside door panel and in the intermediate portion to the outside door panel.

15 Claims, 8 Drawing Sheets

Section A - A

Section B - B

Fig. 6  Circular View A

Section C - C

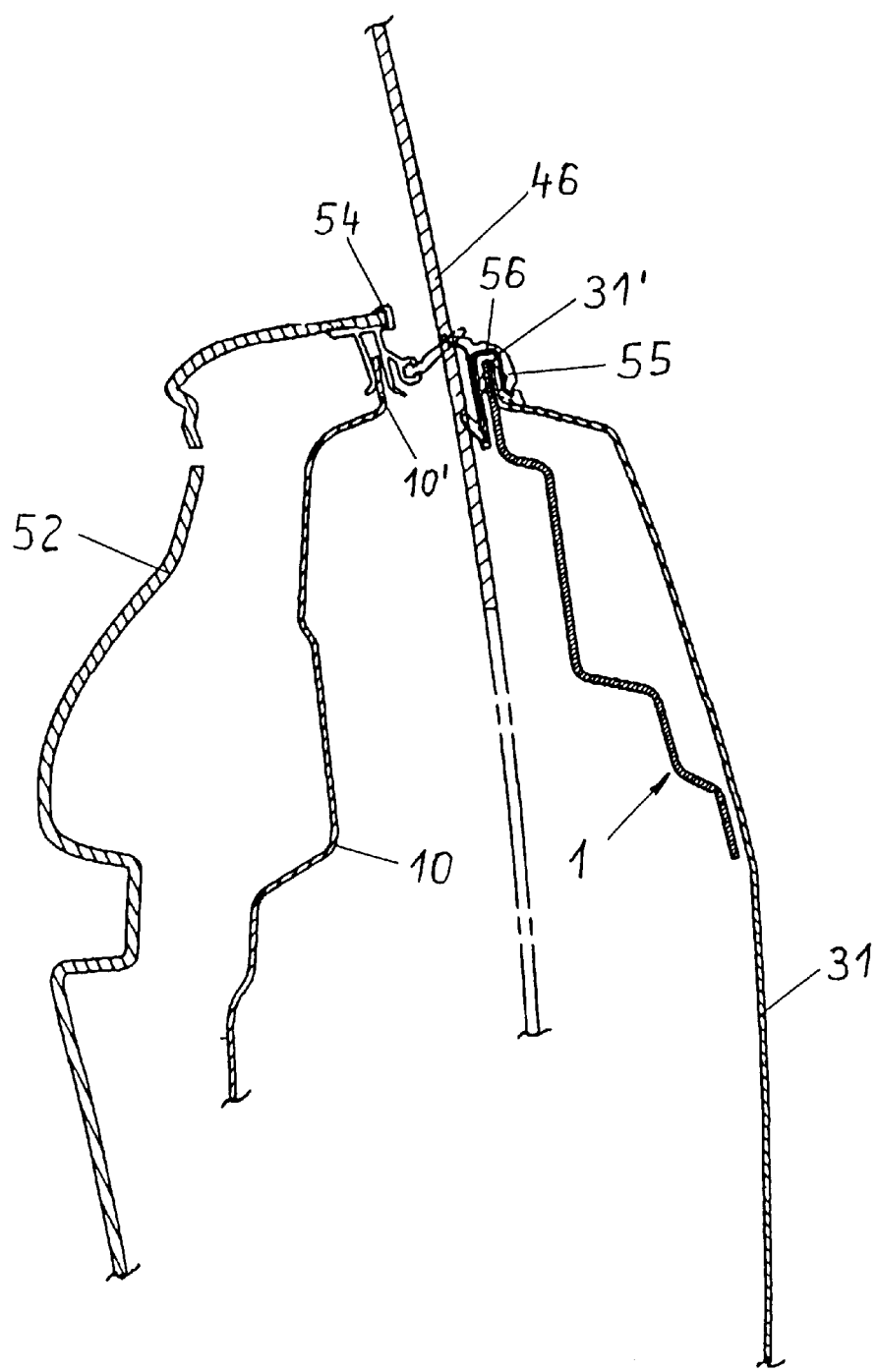
Fig. 8  Section D - D

INTEGRAL DOOR INNER REINFORCEMENT

BACKGROUND OF THE INVENTION

1. Field of the Invention

The invention concerns an integral door inner reinforcement for vehicle doors.

The integral door inner reinforcement serves to increase passenger safety. It is intended to prevent deformation of the door in both frontal and side collisions. A particular need is to ensure that the door can still be opened properly even after an accident. At the same time, the door must not be of such rigid construction that the permissible loads and strain paths are exceeded in the event of inertia-induced collisions of passengers with the inside of the door.

The task of the invention is to satisfy the foregoing oppositely tending goals in an optimal manner.

2. Description of the Prior Art

An integral door inner reinforcement is usually an elongated profiled part of suitable cross section. Various cross-sectional shapes are used. For the required absorption of forces, such an integral door inner reinforcement is usually joined to the inside panel of the door, particularly by spot welds. These reinforcements serve to strengthen the door against buckling below the belt molding.

SUMMARY OF THE INVENTION

According to the invention, the integral door inner reinforcement is realized as an elongated profiled part and is provided with at least one pot-shaped portion. In particular, the elongated portion of the profiled part opens into the pot-shaped portion. The axis of the pot is roughly perpendicular to the longitudinal axis of the profiled part. The pot-shaped portion and its transition to the longitudinal profiled part form a relatively rigid box shape. The arrangement and geometry of this pot-shaped portion between the ends of the elongated integral door inner reinforcement are rigid construction in the region of an occupant's ribs, the construction as a whole can be relatively nonrigid due to the diagonal trussing of the inside panel.

A pot-shaped portion is also considered to be present, for example, if the longitudinal portion has a substantially U-shaped cross section and a cover panel extending perpendicularly to the longitudinal axis is, for example, welded in at the end confronting the hinge, or if the U-shaped cross section is broadened, for example segmentally.

BRIEF DESCRIPTION OF THE DRAWINGS

The invention is described in more detail with reference to the exemplary embodiments depicted schematically in the figures.

In the Drawings:

FIG. 8 is a sectional view taken along line D—D of FIG. 3.

DESCRIPTION OF THE PREFERRED EMBODIMENT

Figure 1:
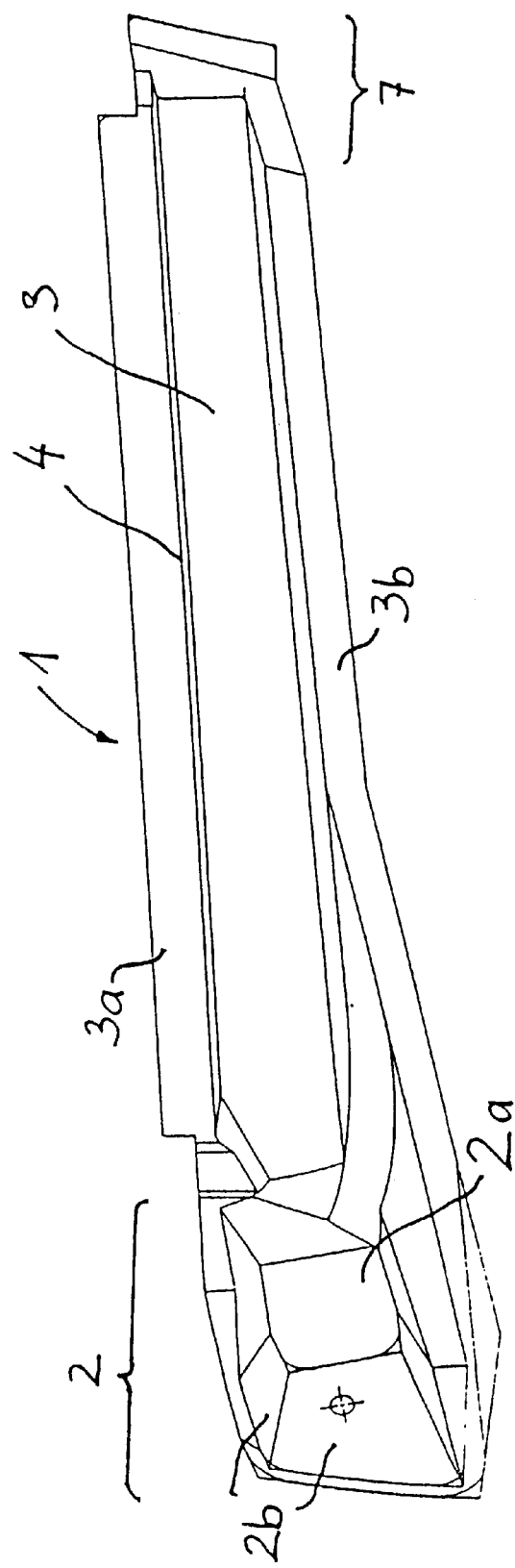
FIG. 1 is a perspective view of one form of an integral door inner reinforcement illustrative of an embodiment of the invention.

The integral door inner reinforcement is realized as an elongated profiled part 1 with a pot-shaped portion 2. The profiled part otherwise consists essentially of a base 3 joined to canted sides 3a and 3b. The pot-shaped portion 2 essentially consists of bottom 2a and sides 2b.

In the drawing, only two of the sides are provided with reference numerals. The task of the invention is basically accomplished by means of any type of reinforcement of the elongated profiled part. For instance, the pot-shaped portion 2 could, for example, be formed of one or more webs that are, for example, joined to the base 3 (by welding or riveting, for example). Such webs would be disposed roughly perpendicularly to the base 3 and, for example, also perpendicularly to the canted sides 3a, 3b, in which case, in particular, a connection to said canted sides can be provided. In the region of canted side 3a, the integral door inner reinforcement is joined to the outside panel at approximately the level of the window cut-out. A mounting 5 for the door hinge is provided below the prolongation of line 4, at front side (or web) 2b, viewed in the direction of travel. In the region of bottom 2a and at the opposite end 7 (in the case of a bar, this would accordingly be the base 3), the integral door inner reinforcement is joined to a panel confronting the passenger, the inside panel. In the region of the hinge mounting 5 (the front side 2b or web), the integral door inner reinforcement is fastened to the door front cover panel, which is usually realized as an integral part of the inside panel that has been canted away therefrom.

Figure 2:
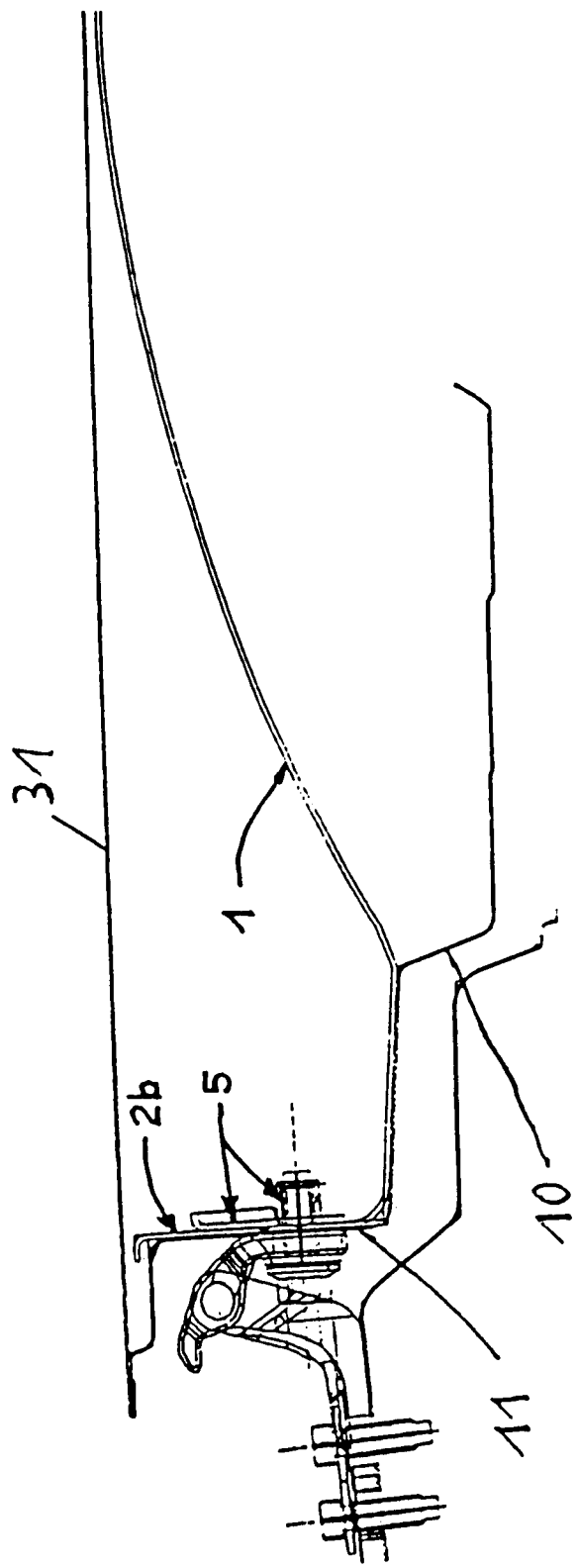
FIG. 2 is a diagrammatic view of a hinge portion in horizontal section.

FIG. 2 shows the hinge region in horizontal section. The integral door inner reinforcement 1 is joined to the inside panel 10 or portion 11 thereof, which is to be viewed as the door cover panel. The mounting 5 for the hinge is provided in the region of web face 2b of the integral door inner reinforcement. Use of the integral door reinforcement as a direct connection to the hinge is considered especially advantageous, since in this way the forces acting on the hinge are conducted directly into the correspondingly rigid structure. This makes for multifunctionality in the case of frontal and side collisions, as well as reinforcement against vertical loads on the door. The connection of the integral door inner reinforcement to the hinge can be made in a great variety of ways. FIG. 2 shows, merely as an example, a nut connected to portion 2b to receive a hinge mounting bolt 51.

Figure 3:
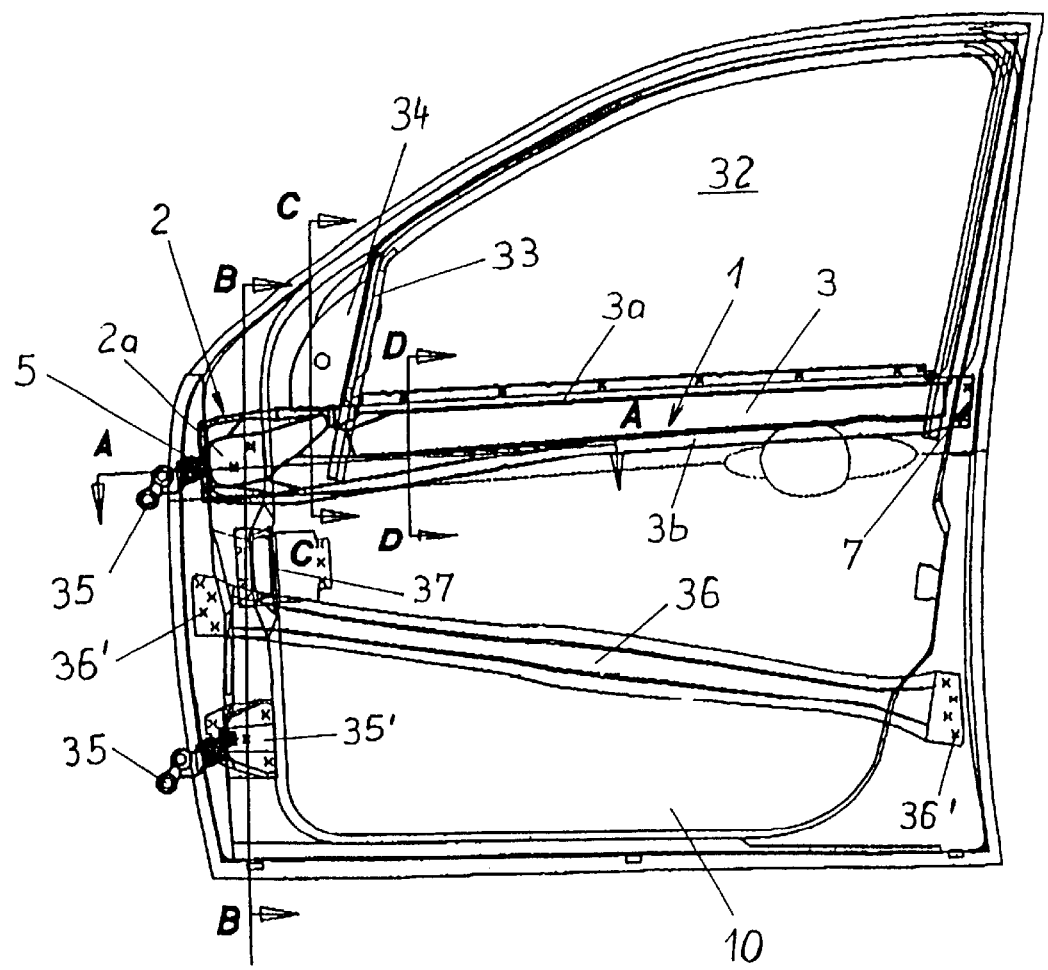
FIG. 3 is a diagrammatic elevational view of an inner surface of an inside panel of a vehicle left door.

FIG. 3 is an overall view of an inner surface of an inside panel 10 of a left vehicle door, viewed in [sic] the direction of travel of the vehicle. The door inner reinforcement according to the invention, namely the elongated profiled part 1, is disposed below a cut-out 32 provided in the panel for a glazing of the door, i.e., at the level of the belt line. The elongated profiled part 1 is essentially the same as that depicted in FIG. 1. The panel cutout 32 is bounded by a window-glass guide channel 33 extending on three sides. Forward, in the direction of travel, of the left vertical leg of guide channel 33 is a triangular mirror-mounting region 34 used for mounting the outside mirror. Disposed at the level of the elongated profiled part I and spacedly therebelow, near the bottom edge of inside panel 10, is in each case a door hinge 35 by which inside panel 10, together with other door components, is articulated on the body. The door hinges 35 are mounted on inside door panel 10 by means of mounting 5. Bottom hinge 35 is fastened to inside panel 10 by means of a bottom hinge reinforcement 35'. Disposed at a mid-level between hinges 35 is a lateral crash bar 36 that extends across the entire width of inside panel 10 and is fastened thereto by means of fastening points 36'. A door check rod reinforcement 37 is further disposed between the door hinges.

Figure 4:
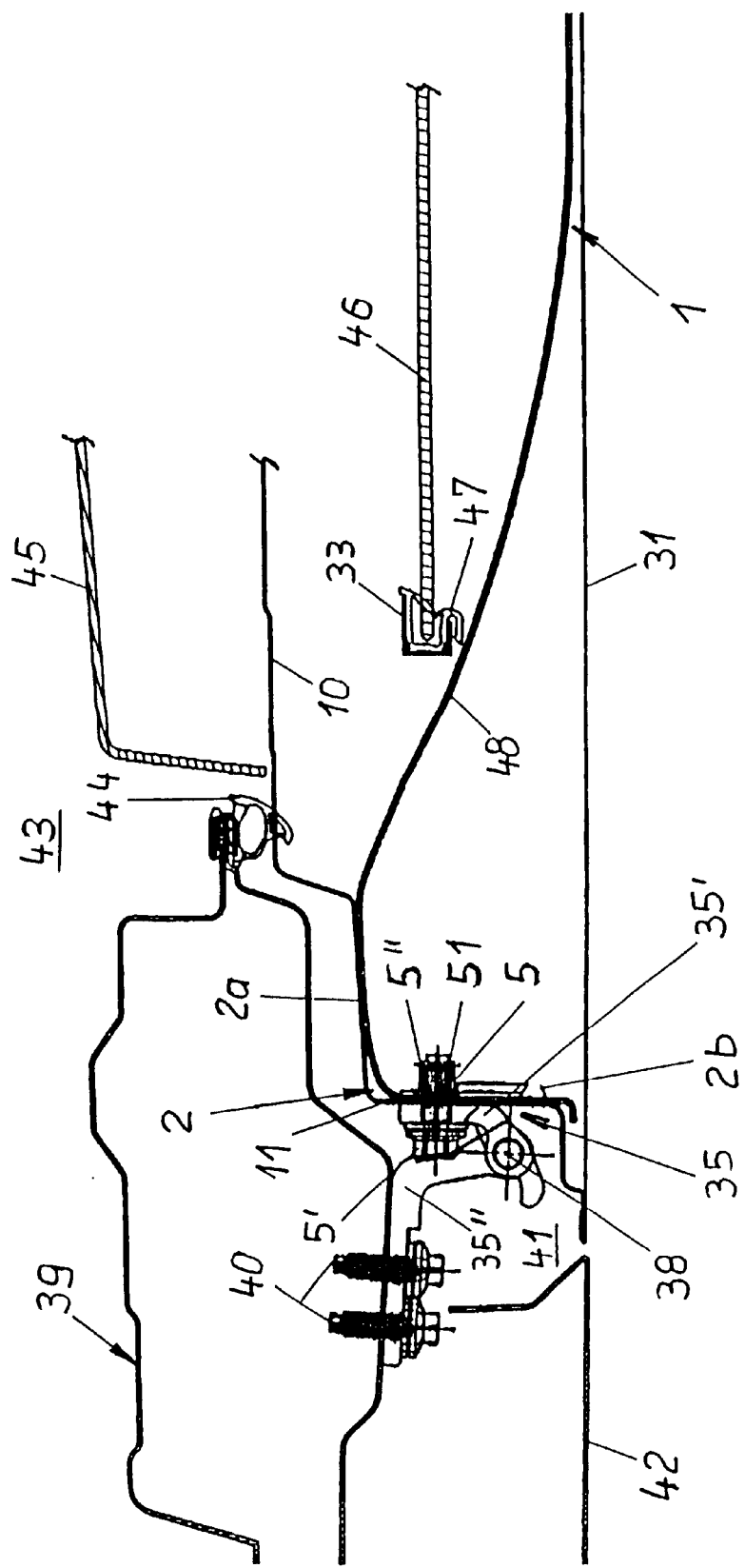
FIG. 4 is a sectional view taken along line A—A of FIG. 3.

FIG. 4 illustrates the horizontal conformation of inside panel 10 at the level of elongated profiled part 1. It can be seen that inside panel 10 has a canted portion 11 to which door hinge 35 is affixed by means of mounting 5. Shown as the mounting means of mounting 5 is a mounting bolt 5' that is screwed into a mounting nut 5" and with its head clamps the leaf-side binding portion 35' together with portion 11. The door is mounted on the body, specifically on the A-pillar 39, via leaf-side side hinge portion 35', a hinge pin 38 and a body-side hinge portion 35". Here the mounting means is the screw-type fasteners 40 shown. A fold area 41, which serves, inter alia, to receive the door hinge 35, is covered by an outer skin 42 of a fender (not shown further), as well as by outside panel 31 of the door, which is crimped together with portion 11 of inside panel 10. A passenger compartment 43 is sealed against fold area 41 and thus the outside of outside panel 31 by means of a seal 44 that is sealingly connected to the inside of inside panel 10 and is otherwise covered by a door trim panel 45.

Arranged between inside panel 10 and outside panel 31, which is spacedly disposed with respect thereto, is window glass 46, one edge of which in FIG. 4 is guided by the window-glass guide channel 33 vertically to the plane of drawing in a seal 47. Arranged between the glass 46 and outside panel 31 is the elongated profiled part 1, specifically with its pot-shaped portion 2 forward in the direction of travel. The bottom 2a of pot-shaped portion 2 is welded to inside panel 10 at a plurality of locations; FIG. 3. One of the sides 2b is connected by means of hinge mounting bolts 51 to portion 11 canted away from inside panel 10. Portion 11 forms a door cover panel.

A transitional portion 48 of elongated profiled part 1 extends, continuously changing its shape, from bottom 2a of pot-shaped portion 2 toward outside panel 31. Said transitional portion 48 is shaped to yield a defined curvature of the belt line. There is in particular a stiffening in the triangular mirror-mountino region, where buckling loads are especially likely to be imposed on the door in the case of frontally acting forces.

Figure 5:
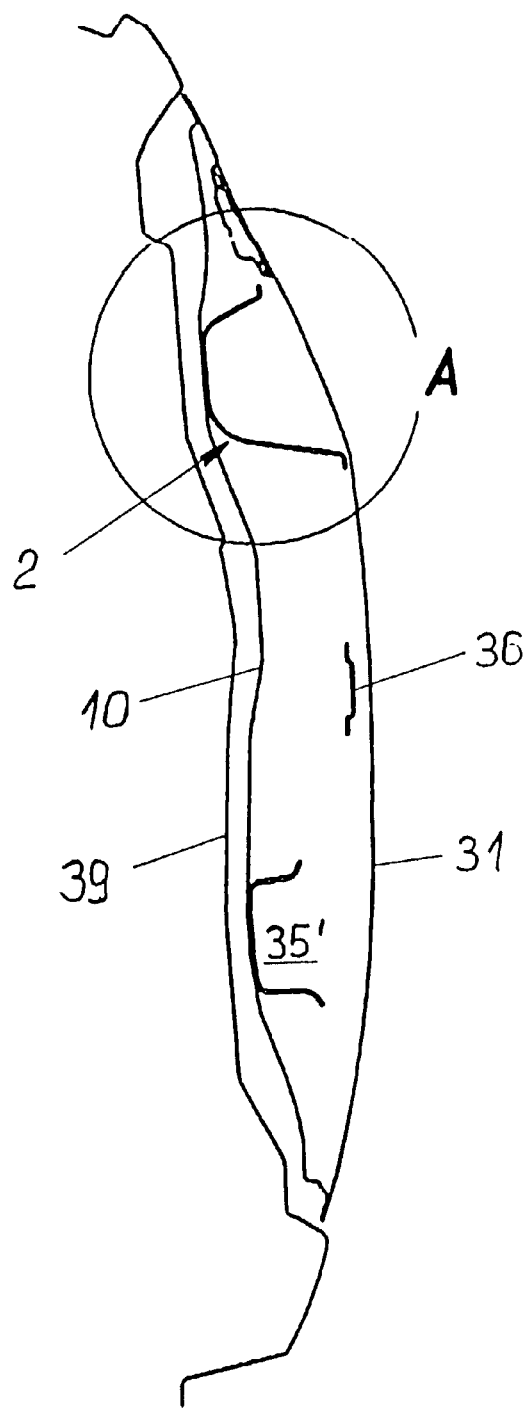
FIG. 5 is a sectional view taken along line B—B of FIG. 3.
Figure 6:
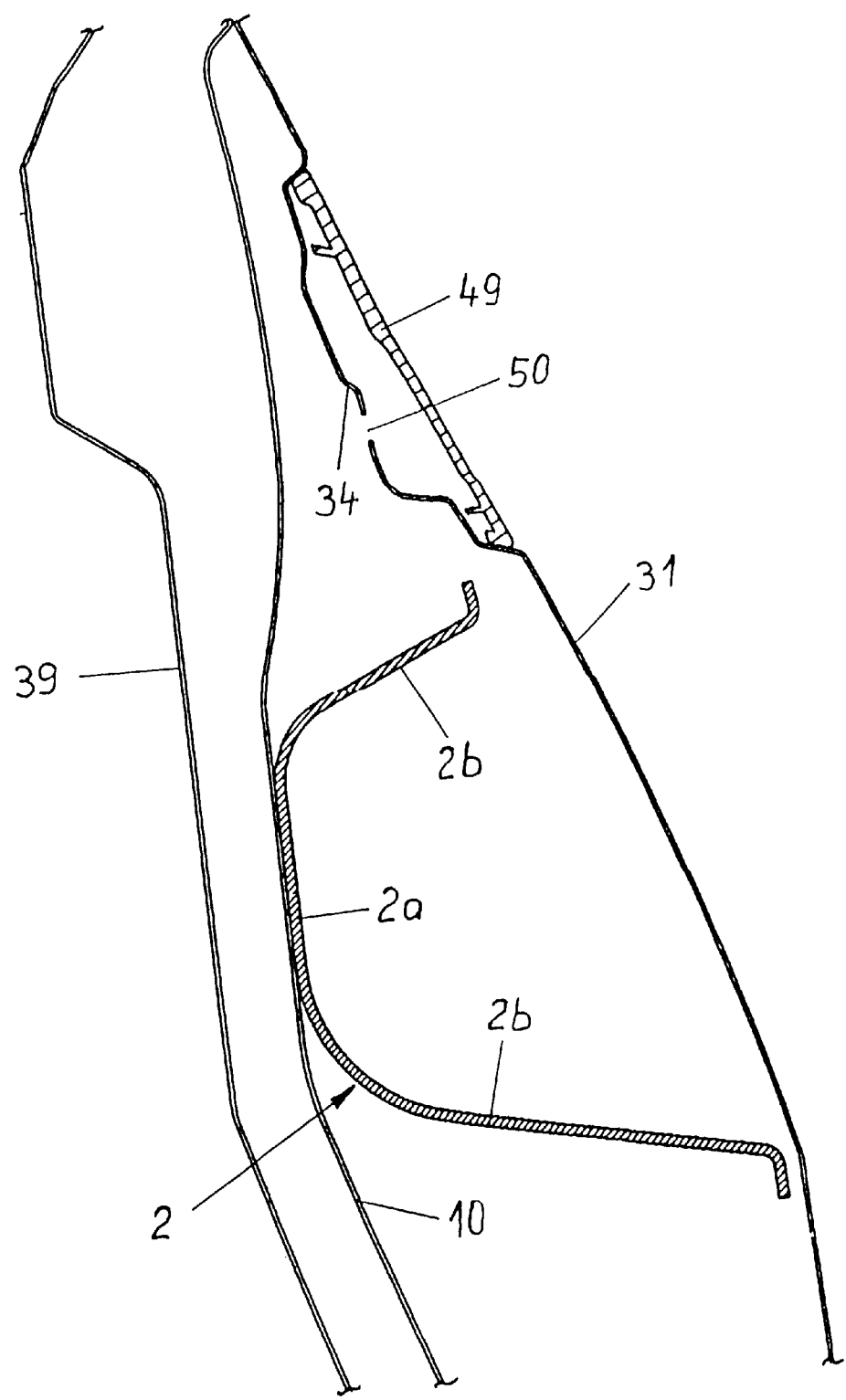
FIG. 6 is an enlarged generally sectional view taken from circle A of FIG. 5.

The vertical section along line B—B of FIG. 3 that is shown in FIG. 5 schematically illustrates the major components of the door in the vicinity of door hinge 35. In particular, the pot shape of pot-shaped portion 2 is readily apparent here in conjunction with FIG. 6, circular view A from FIG. 5. Pot-shaped portion 2 occupies almost the entire space between outside panel 31 and inside panel 10 in the region of the belt line of the door, i.e., below the panel cut-out 32. Sides 2b, which are disposed practically perpendicularly to bottom 2a and are accordingly also realized roughly at right angles to the sides 2b shown in FIG. 4, form with transitional portion 48 a structure that is very rigid in all planes. Disposed above this structure is a mirror foot 49, made, for example, of plastic and fastened to the triangular mirror-mounting region 34 in a manner not shown, for example by means of a mounting hole 50. Arranged below elongated profiled part 1 and thus pot-shaped portion 2 is the lateral crash bar 36. Inside panel 10 of the door leaf is shaped to conform to A-pillar 39 of the vehicle body.

Figure 7:
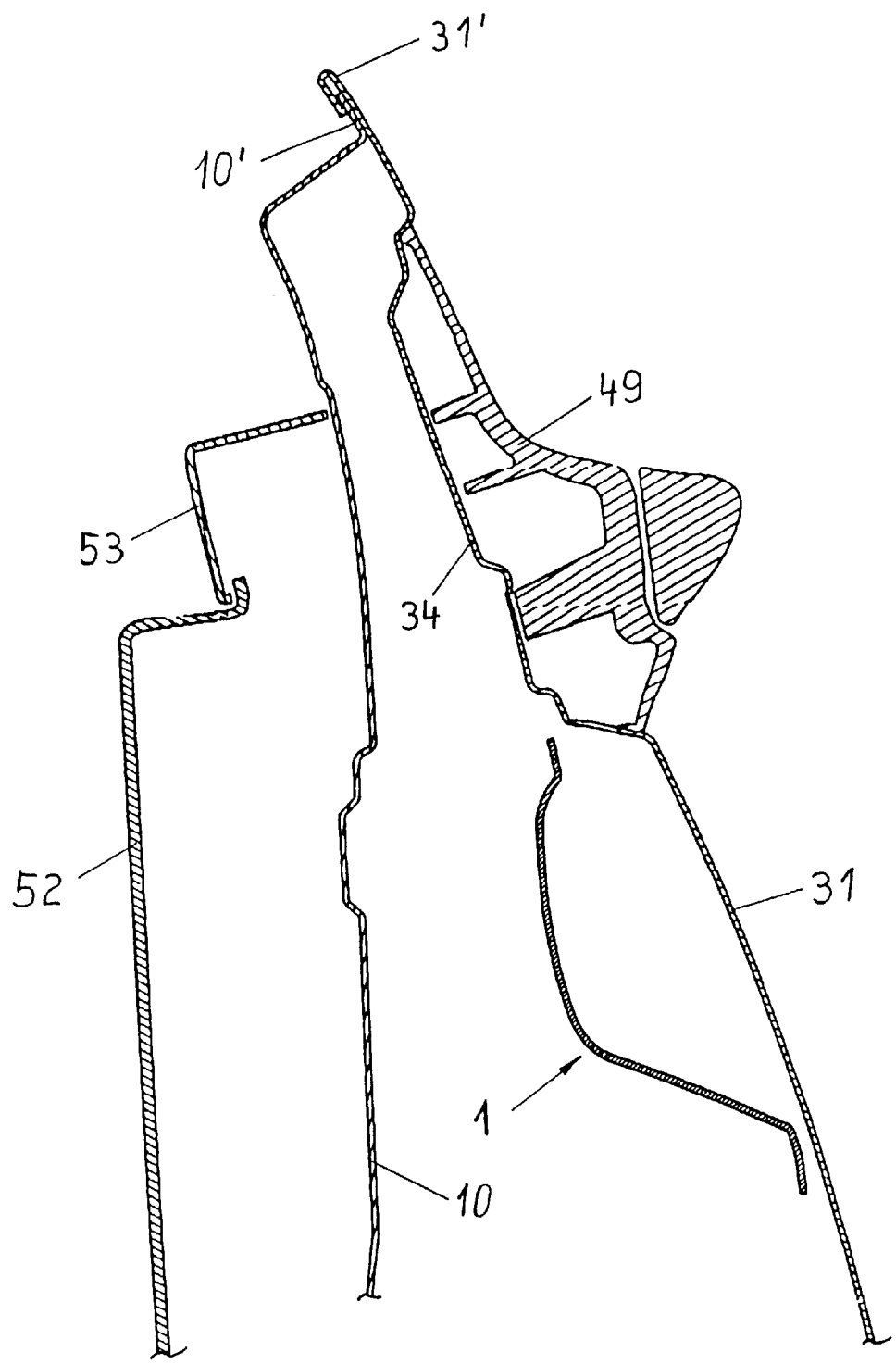
FIG. 7 is a sectional view taken along line C—C of FIG. 3.

FIG. 7, taken along section C—C, shows how elongated profiled part 1 approaches the outside panel due to transitional portion 48 visible in FIG. 4, substantial reinforcement of the belt line still consistently being present below triangular mirror-mounting region 34 for receiving mirror foot 49. Inside panel 10, the top edge 10' of which is crimped together with the top edge 31' of outside panel 31, is covered on its passenger-compartment side with a door trim panel 52, made of plastic, for example, supplemented in the triangular mirror-mounting region 34 by a triangular mirror-mounting trim panel 53.

FIG. 8 shows the realization of the belt-line reinforcement of outside panel 31 in further detail. Section D—D is situated outside triangular mirror-mounting region 34, and the figure therefore shows the window glass 46, abutted on the inside by a pane inner seal 54 and sealingly abutted on the outside by a pane outer seal 55. The pane inner seal 54 is mounted in the manner shown on the door trim panel 52 and on the top edge 10' of inside panel 10. The pane outer seal 55 is mounted both on a horizontal top edge 31' of outside panel 31 and on a top edge 56 of elongated profiled part 1. Top edge 56 is fixedly connected, e.g., welded, to top edge 31'. The connection extends roughly from triangular mirror-mounting region 34 to an end 7 opposite pot-shaped portion 2 (FIG. 3). The cross section of elongated profiled part 1 is flattened here so as not to interfere with mountings for the window glass.

What is claimed is:

1. An integral door inner reinforcement for vehicle doors having door panels comprising at least one outside panel, at least one inside panel, and at least one door cover panel that extends substantially perpendicularly to the outside and inside panels, the reinforcement comprising an elongated profiled part provided with at least one pot-shaped portion, wherein said outside panel and said inside panel are spacedly disposed from each other, and wherein said outside panel is provided with a sheet-metal belt-line reinforcement that extends as the elongated profiled part along a window cut-out between the panels, and wherein the belt-line reinforcement comprises the pot-shaped portion that is fastened to the inside panel and renders the elongated profile part more rigid.

2. A door inner reinforcement according to claim 1, wherein a first connection is made to the inside panel and a second connection to the outside panel.

3. A door inner reinforcement according to claim 1, wherein a connection is made to a door panel proximate the pot-shaped portion, the connection comprising a plurality of connection points.

4. A door inner reinforcement according to claim 1, wherein the pot-shaped portion is disposed proximate a front portion of a door, viewed in a direction of travel.

5. A door inner reinforcement according to claim 1, wherein the pot-shaped portion is joined on at least one side portion and on a bottom portion to at least one of the door panels.

6. A door inner reinforcement according to claim 1, wherein a hinge mounting is connected to the pot-shaped portion.

7. A door inner reinforcement according to claim 1, wherein a connection to the inside panel is made at opposite ends of the elongated profiled part, and therebetween a connection is made to the outside panel.

8. A door reinforcement according to claim 1, wherein the pot-shaped portion is fastened by a bottom portion to the inside panel (10), and a front side of the pot-shaped portion viewed in the direction of travel, is fastened to a front door cover panel.

9. A door reinforcement according to claim 1, wherein a door hinge of a vehicle door is connected to the pot-shaped portion.

10. A door reinforcement according to claim 9, wherein the door cover panel comprises a canted portion of the inside panel and is connected to the pot-shaped portion and to the door hinge by means of a hinge mounting bolt.

11. A door reinforcement according to claim 1, wherein the elongated profiled part is joined to the outside panel proximate a canted side of a base portion that abuts the pot-shaped portion.

12. A door reinforcement according to claim 1, wherein the pot-shaped portion and its transition to the longitudinal profiled part forms a box shape.

13. An integral door inner reinforcement for passenger-vehicle doors in accordance with claim 1, wherein the reinforcement is adapted for direct connection to a hinge.

14. An integral door inner reinforcement, for passenger-vehicle doors in accordance with claim 1, wherein the reinforcement is adapted to receive at least one mounting means of a hinge.

15. An integral door inner reinforcement for vehicle doors having door panels comprising at least one outside panel, at least one inside panel, and at least one door cover panel that extends substantially perpendicularly to the outside and inside panels, the reinforcement comprising an elongated profiled part provided with at least one pot-shaped portion, wherein said elongated profiled part is joined to the outside panel proximate a canted side of a base portion that abuts the pot-shaped portion.

* * * * *